United States Patent
Horne (10) Patent No.: US 7,317,844 B1
(45) Date of Patent: *Jan. 8, 2008

(54) TONAL BALANCING OF MULTIPLE IMAGES

(75) Inventor: James H. Horne, Boulder, CO (US)

(73) Assignee: Orbimage Si Opco, Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/753,272

(22) Filed: May 24, 2007

Related U.S. Application Data (63) Continuation of application No. 10/423,720, filed on Apr. 25, 2003, now Pat. No. 7,236,646.

(51) Int. Cl.
*G06K 9/36* (2006.01)

(52) U.S. Cl. .................. 382/284; 382/103; 382/274; 382/294

(58) Field of Classification Search ............... 358/450; 382/103, 144, 167, 274, 284, 294
See application file for complete search history.

(56) References Cited

U.S. PATENT DOCUMENTS

| | | | |
|---|---|---|---|
| 5,343,410 A | 8/1994 | Tsujiuchi et al. | |
| 5,982,951 A | 11/1999 | Katayama et al. | |
| 5,987,164 A | 11/1999 | Szeliski et al. | |
| 5,987,189 A | 11/1999 | Schmucker et al. | |
| 5,991,461 A | 11/1999 | Schmucker et al. | |
| 5,999,662 A | 12/1999 | Burt et al. | |
| 6,009,190 A | 12/1999 | Szeliski et al. | |
| 6,097,854 A | 8/2000 | Szeliski et al. | |
| 6,215,968 B1 | 4/2001 | Uehara et al. | |
| 6,222,938 B1 | 4/2001 | Melen | |
| 6,373,482 B1 | 4/2002 | Migdel et al. | |
| 6,381,375 B1 | 4/2002 | Reyzin | |
| 6,393,163 B1 | 5/2002 | Burt et al. | |
| 6,574,365 B1 | 6/2003 | Weldy | |
| 6,633,689 B2 | 10/2003 | Yamamoto | |
| 6,694,064 B1 | 2/2004 | Benkelman | |
| 6,735,348 B2 | 5/2004 | Dial et al. | |
| 6,910,892 B2 | 6/2005 | Lechner | |
| 6,928,194 B2 | 8/2005 | Mai et al. | |
| 7,236,646 B1 * | 6/2007 | Horne .................. 382/284 |
| 2007/0076103 A1 * | 4/2007 | Tamaru et al. .......... 348/254 |

* cited by examiner

*Primary Examiner*—Gregory M Desire
(74) *Attorney, Agent, or Firm*—Bruce E. Dahl; Susan E. Chetlin (57) ABSTRACT

Method for tonally balancing a image mosaic includes supplying the image mosaic which has multiple overlap regions; identifying in the overlap regions a set of corresponding points that correspond to a single location and are indicative of a tonal variation; establishing a tonal variation threshold; eliminating from the overlap regions a subset of corresponding points, the subset having tonal variation deviating from the tonal variation threshold; repeating the eliminating until substantially all subsets have been eliminated, producing adjusted overlap regions that include a set of remaining corresponding points; obtaining gains and biases for each spectral band in the adjusted overlap regions; applying the gains and biases to transform intensities of the set of remaining corresponding points, producing transformed corresponding points; and producing a tonally balanced image mosaic using the transformed corresponding points.

14 Claims, 10 Drawing Sheets

TONAL BALANCING OF MULTIPLE IMAGES

The present application is a continuation of nonprovisional application Ser. No. 10/423,720, filed Apr. 25, 2003 now U.S. Pat. No. 7,236,646, which is incorporated herein by reference for all that it discloses.

BACKGROUND OF THE INVENTION

Images, such as satellite images, can be combined to produce one large panorama or mosaic of images. One problem encountered in combining images is that the images are often not tonally balanced. Tonal imbalances can be caused by a variety of factors. With respect to satellite images, for example, tonal imbalances can be caused by differences in the angle of the camera in relationship to the sun, or differences in the moisture content of the air when pictures are taken on different days. If the images are not tonally balanced, visible seams can appear where the different images come together. The differences between the tones of the images used in the panorama or mosaic can become even more noticeable when the images are taken at different times or different seasons because of differences in the brightness and position of the sun.

One approach that has been used to balance images is to tonally balance a single pair of images at a time. Because this approach only allows two images to be balanced at a time, a user is required to determine a path through the image mosaic when balancing the images. Different paths can result in greatly differing results. This approach is inherently unstable, as it is subject to choices made by the user in selecting a path, and is also time-consuming for the user.

SUMMARY OF THE INVENTION

In one embodiment of the present invention, a method for tonally balancing an image mosaic comprises supplying the image mosaic, the image mosaic having multiple overlap regions; identifying in the overlap regions a set of corresponding points, the corresponding points corresponding to a single location and being indicative of a tonal variation; establishing a tonal variation threshold; eliminating from the overlap regions a subset of corresponding points, the subset having tonal variation deviating from the tonal variation threshold; repeating the eliminating until substantially all subsets have been eliminated, producing adjusted overlap regions comprising a set of remaining corresponding points; obtaining gains and biases for each spectral band in the adjusted overlap regions; applying the gains and biases to transform intensities of the set of remaining corresponding points producing transformed corresponding points; and producing a tonally balanced image mosaic using the transformed corresponding points.

Another embodiment of the present invention comprises a machine readable medium having stored thereon instructions that when executed by the machine cause the machine to tonally balance a set of overlapping images by: using a subset of corresponding points in each of a plurality of image overlap regions to solve a set of minimization equations for gains and biases for each spectral band of each image, the corresponding points being points from different images having locations that correspond to each other, the subset of corresponding points consisting of corresponding points whose intensities differ less than a threshold, applying the gains and biases to the images, iterating the using and applying actions for a predetermined number of iterations, the iterating resulting in an iterated gain and an iterated bias for each spectral band of each image; transforming intensities of points for each spectral band in each image using the iterated gain and the iterated bias for the corresponding spectral band to produce transformed intensities of points; and producing a tonally balanced image mosaic by using the transformed intensities of points in the images.

BRIEF DESCRIPTION OF THE DRAWINGS

Illustrative embodiments of the invention are illustrated in the drawings in which.

DETAILED DESCRIPTION

Figure 1:
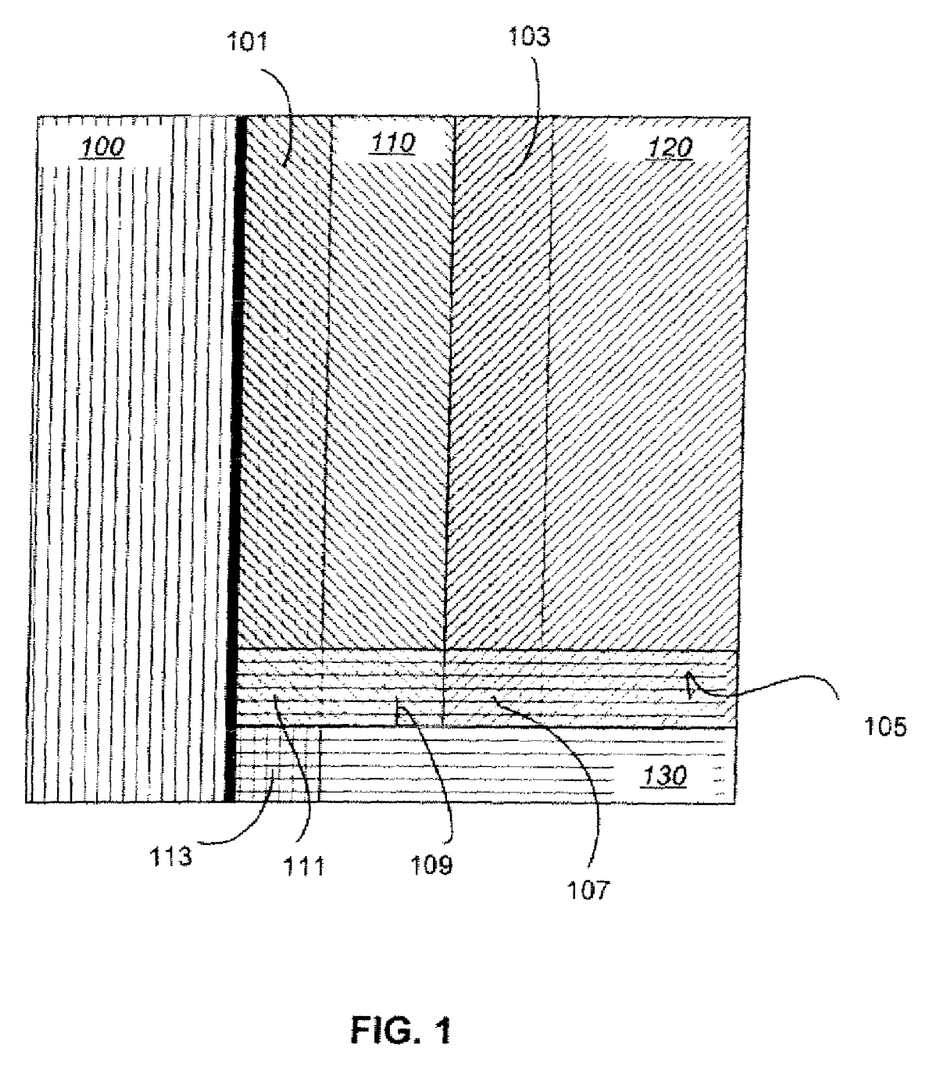
FIG. 1 illustrates an image mosaic constructed from multiple images.

As shown in FIG. 1, an image mosaic may be produced from multiple overlapping images 100, 110, 120, and 130. By way of example, images 100, 110, 120, 130 may be images taken from a satellite. The image mosaic may include multiple overlap regions 101, 103, 105, 107, 109, 111, 113. Image 100 overlaps with image 110 at overlap region 101. Similarly, image 110 overlaps with image 120 at overlap region 103, image 120 overlaps with image 130 at overlap region 105, image 110 overlaps with image 130 at overlap region 109, image 130 overlaps with image 100 at overlap region 111. Overlap regions may additionally include regions, such as regions 111 and 107, where more than two of the images overlap. Images 100, 110, and 130 overlap in region 111 and images 110, 120, and 130 overlap in region 107. It should be appreciated that other image mosaics may be a combination of a different number of images and may have different overlap regions than that shown in FIG. 1.

The images 100, 110, 120, 130 may have been taken at different times or even different seasons. Differences in light conditions or atmospheric conditions at the time the images were taken may create noticeable differences in the intensities of points in regions where they overlap. The imbalances may cause visible seams to appear where the images overlap.

Tonal Balancing of Images

Figure 2:
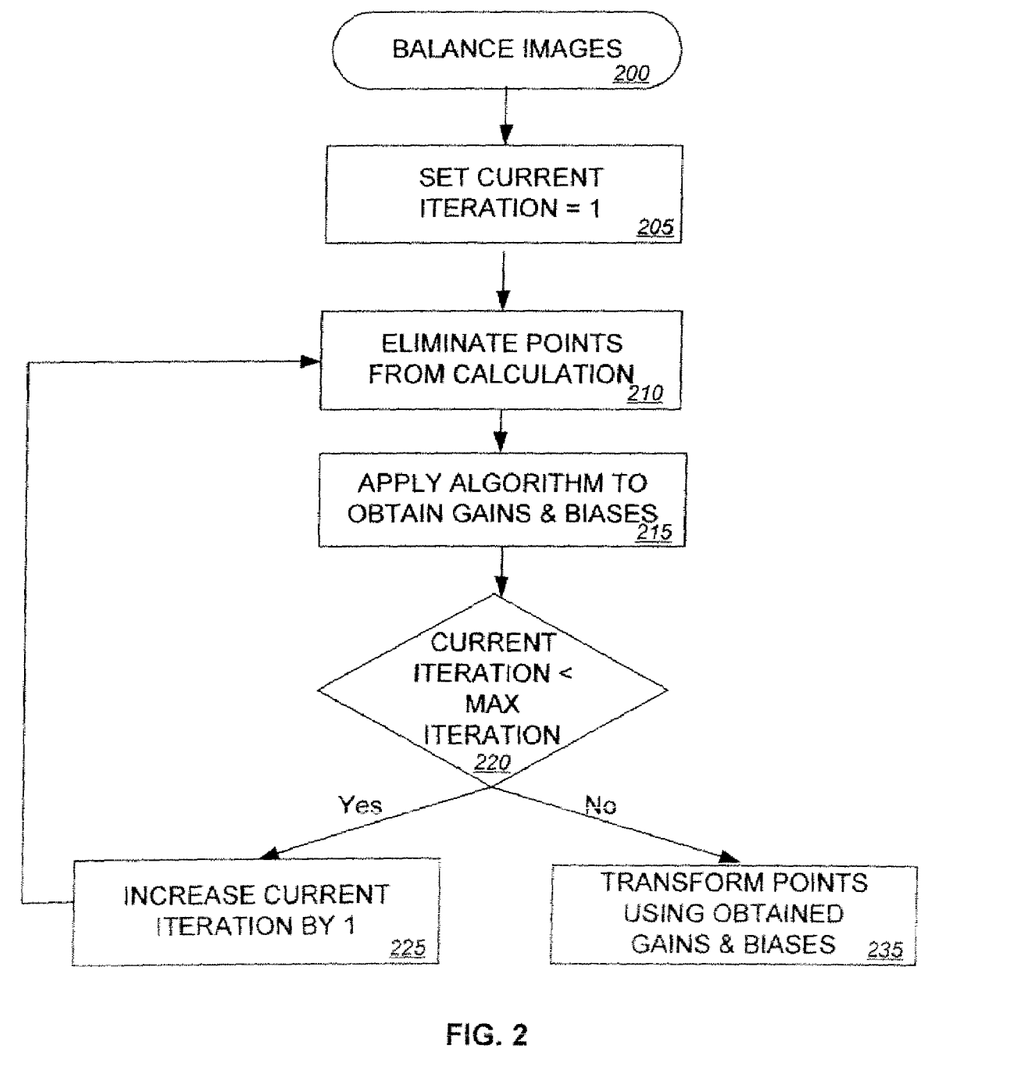
FIG. 2 is a flow diagram illustrating an exemplary method for tonally balancing multiple images.

FIG. 2 illustrates a method 200 that may be used to tonally balance images 100, 110, 120, 130. In block 205, a current iteration variable is set to 1, indicating the process is in the first iteration. It should be appreciated that in alternate embodiments, the process described in FIG. 2 may be performed only once and may not include the current iteration variable.

Next, points in one or more overlap regions may be eliminated 210 from use in the algorithm to tonally balance the images. In one embodiment, this may minimize or eliminate the skewing of the balancing algorithm that may be caused by variations between the images in the overlap regions. For example, variations may be caused by differences in clouds or water appearing in the images. Eliminating points that correspond to these artifacts may result in achievement of a better tonal balance between the images.

Figure 3A:
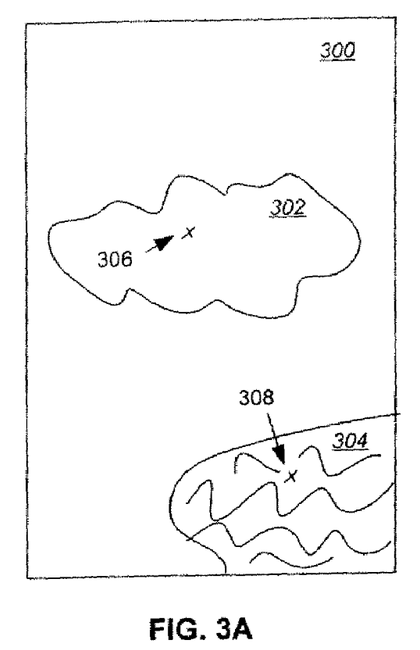
FIG. 3A illustrates a section of a first image that may have points eliminated by the method of FIG. 4.
Figure 3B:
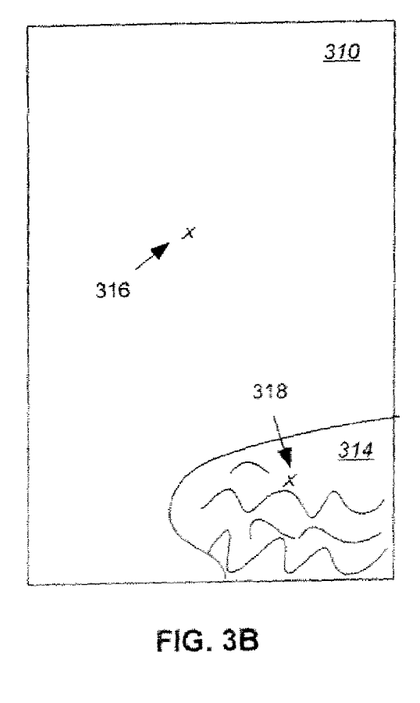
FIG. 3B illustrates a section of a second image that may overlap with the section of FIG. 3A and may have points eliminated by the method of FIG. 4.

FIGS. 3A and 3B illustrate an exemplary scenario that may cause color and intensity differences between corresponding points in an overlap region. FIG. 3A illustrates a portion of an image 300 that includes a cloud 302 and water 304. Point 306 is located in the cloud 302 and point 308 is located in the water 304.

FIG. 3B illustrates a corresponding section of an image 310 that overlaps with image 300. Image 310 includes point 316 corresponding to point 306. However, there are no clouds appearing in image 310. Therefore, points 306 and 316 may have differences in color and intensities caused by cloud 302. Thus, these points may be eliminated from use 210 in the algorithm to balance the images by a process such as the method described below with reference to FIG. 3.

Image 310 additionally includes point 318 corresponding to point 308. Point 318 is located in water 314 that corresponds to water 304 appearing in image 300. Because the water is always in motion, light is reflecting off the water at different angles. Although a large water body may be generally dark, there may be numerous point mismatches between two images caused by the differences between the surfaces of water 304 and water 314, even if the images were taken at about the same time. These points may also be eliminated from use 210 in the algorithm to balance the images in the method of FIG. 3. Methods that may be used to eliminate points from the calculation will be described in further detail below.

Returning to FIG. 2, after points have been eliminated from the calculation 210, an algorithm 215 is applied to obtain gains and biases for each spectral band (e.g., red, green, blue, infrared) of each image. The algorithm used chooses the gains and biases so that differences in intensities between points in each overlap region where images overlap are minimized.

In one embodiment, the algorithm used is the linear least squares minimization of Equation (1).

$$\chi^2 = \chi_{overlap}^2 + \chi_{gain}^2 + \chi_{bias}^2 + \chi_{mix}^2 \qquad (1)$$

A subset of corresponding points (points from different images that have locations that correspond to each other) in each of the overlap regions from which points have been eliminated 210 may be used to solve the minimization equation. The terms in Equation (1) will be described in further detail below.

The first term used in the minimization equation (1) is an overlap term that calculates the differences squared of two transformed image intensities over all the points where they overlap. This term is shown in Equation (2).

$$\chi_{overlap}^2 = \sum_{i=1}^{N} \sum_{j=1}^{i-1} \sum_{\beta=1}^{B} w_{ij}^{\beta} \sum_{n^{\beta} \in \Theta_{ij}} (\tilde{I}_{in}^{\beta} - \tilde{I}_{jn}^{\beta})^2 \qquad (2)$$

Letting N represent the total number of images to be balanced and B represent the number of spectral bands per image, the differences squared between transformed intensities $\tilde{I}$ are summed over all points n that are located in an overlap $\Theta$ between a pair of images i, j in band $\beta$ that have not been eliminated 210 from the calculation.

The transformed intensities $\tilde{I}$ for points in a spectral band $\beta$ may be calculated similarly to that shown in Equation (3).

$$\tilde{I}_{in}^{\beta} = g_i^{\beta}(I_{in}^{\beta} - a_i^{\beta} + s_{in}^{\beta}) + b_i^{\beta} \qquad (3)$$

where a is an atmospheric correction, s is a backscattering correction, and g and b are the gains and biases parameters solved for in the minimization equation (1). The atmospheric correction a will be described in further detail below. The backscattering correction s may be needed in images having a noticeable east-west drift in intensity caused by atmospheric sunlight reflection and changes in the camera-target-sun geometry across the image. The backscattering correction s may depend on the location of the point in the image and is usually approximated as a linear drift. Other suitable methods of calculating a backscattering correction may also be used. It should be appreciated that some embodiments may not include the atmospheric correction and/or the backscattering correction.

In one embodiment, the differences between the transformed intensities are multiplied by a weighting factor w. The differences between the transformed intensities multiplied by the weighting term w are then summed over all spectral bands β for all image pairs i, j. The weighting factor w may be calculated for each band of each overlapping pair of images. By way of example, the weighting factor w may be chosen so that 1/w equals the number of points included in the overlap (i.e., the total number of points in the overlap minus the number of points eliminated from the calculation 210). This effectively treats all overlaps with equal importance. The weighting factor w may also be set to zero if the overlap contains only a small number of points, thus effectively not including the overlap in the minimization equation (1). In alternate embodiments, the weighting term w may not be included or may be calculated differently.

The second term in Equation (1) is a gain term that encourages the gains obtained from the minimization equation to be close to a desired gain (e.g., 1). Gains that stray from the desired gain may be penalized. In one embodiment, the gain term may be a term such as the term shown in Equation (4).

$$\chi_{gain}^2 = \sum_{i=1}^{N} \sum_{\beta=1}^{B} [w_g(g_i^{\beta} - \bar{g})^2 + 2\lambda_g^{\beta}(g_i^{\beta} - \bar{g})] \qquad (4)$$

where i is an image in the mosaic, N is the total number of images to be balanced, β are the spectral bands in the image, $w_g$ is a constant determining the strength of this term, $g_i$ is the parameter for the gain for image i in spectral band β being solved for in Equation (1) and $\bar{g}$ is the desired gain value. Higher values of the gain weight $w_g$ will force the gains closer to the desired gain while lower values will allow the gains to move more freely away from the desired gain. In one embodiment, the images are 11-bit images and $w_g$ is 4000. In another embodiment, the images are 8-bit images and $w_g$ is 400. Equation (4) additionally includes a Lagrange multiplier $\lambda_g^\beta$ to force the average gain for each band to be equal to the desired gain. It should be appreciated that in alternate embodiments, the gain term may be different from that shown in Equation (4) or the minimization equation (1) may not include a gain term.

The third term of Equation (4) is a bias term that encourages the biases obtained from the minimization equation to be close to a desired bias (e.g., 0). Biases that stray from the desired bias may be penalized. In one embodiment, the bias term may be a term as shown in Equation (5).

$$\chi^2_{bias} = \sum_{i=1}^{N} \sum_{\beta=1}^{B} w_b (b_i^\beta - \bar{b})^2 \qquad (5)$$

where i is an image in the mosaic, N is the total number of images to be balanced, β are the spectral bands in the image, $w_b$ is a constant determining the strength of this term, $b_i$ is the parameter for the bias for image i in spectral band β being solved for in Equation (1) and $\bar{b}$ is the desired bias value. In one embodiment, the biases are allowed to move around freely and the default value for $w_b$ is set at 1/2048 for 11-bit images and 1/256 for other images. It should be appreciated that in alternate embodiments, the minimization equation (1) may not include a bias term or may include a bias term different from that shown in Equation (5).

The last term of Equation (1) is a mixing term, which may influence the obtained gains and biases for a particular band of an image to be close to the obtained gains and biases of the other bands of the same image. This term is illustrated in Equation (6).

$$\chi^2_{bias} = \sum_{i=1}^{N} \sum_{\alpha=1}^{B} \sum_{\beta=1}^{\alpha-1} [\Lambda_g(g_i^\alpha - g_i^\beta)^2 + \Lambda_b(b_i^\alpha - b_i^\beta)^2] \qquad (6)$$

where i is an image in the mosaic, N is the total number of images to be balanced, β is a first spectral band of an image and α is a second spectral band of the image, $\Lambda_g$ is a constant encouraging the gains across bands for an image to be similar, $\Lambda_b$ is a constant encouraging the biases across bands for an image to be similar, and $g_i$ and $b_i$ are the parameters for the gain and bias for spectral bands α and β being solved for in Equation (1).

In one embodiment $\Lambda_g$ may be 5 times the constant $w_g$ used in the gain term to keep the gains close to a desired gain. This may encourage a smaller variation of gains between bands than between images. The bias mix weight $\Lambda_b$ may be weaker and may be set to be equal to the constant $w^g$ used in the bias term to keep the biases close to a desired bias. In some embodiments, a particular band, such as an infrared band, may not vary in the same manner as the other bands, and may be excluded from the mixing term. It should be appreciated that alternate embodiments may not include the mixing term or may include a different mixing term than that shown in Equation (6).

A standard procedure for solving a linear least squares minimization may now be used to solve Equation (1). The parameters $p_m$ to be solved for belong to the set $$\{g_i^\beta, b_i^\beta, \lambda_g^\beta\}$$

so m=1, . . . , B(2N+1). It should be appreciated that after Equation (1) is solved, different gains and biases are obtained for each band of each image. In alternate embodiments, a different algorithm, such as a non-linear least squares minimization, may be used to obtain gains and biases. Additionally, the equations may not include an index β into the spectral bands and may not consider each band of the image separately.

After the gains and biases have been obtained 215, a check is used to determine whether the current iteration is less than a maximum number of iterations 220. In one embodiment, the process of balancing the images may be iterated six times. If the number of iterations is less than the maximum number of desired iterations, the current iteration is increased by 1, and the method continues with eliminating points from the calculation of the next iteration 210. It should be appreciated that by iterating the process of eliminating points 210 and applying the algorithm 215, a better tonal balance between the images may be achieved. However, in alternate embodiments, the process may not be iterated. Instead, the process may be performed only once and points in the overlap regions may or may not be eliminated 210 from use in the algorithm.

After the last iteration has been completed, the points in the images are transformed 235 using the value of the gains and biases obtained in the last iteration. The transformation equation may also include atmospheric corrections and backscattering corrections such as described with reference to Equation (3). It should be appreciated that in alternate embodiments, gains and biases from the last iteration may be output from the process and the points may not be transformed.

Eliminating Points from Calculation

Figure 4:
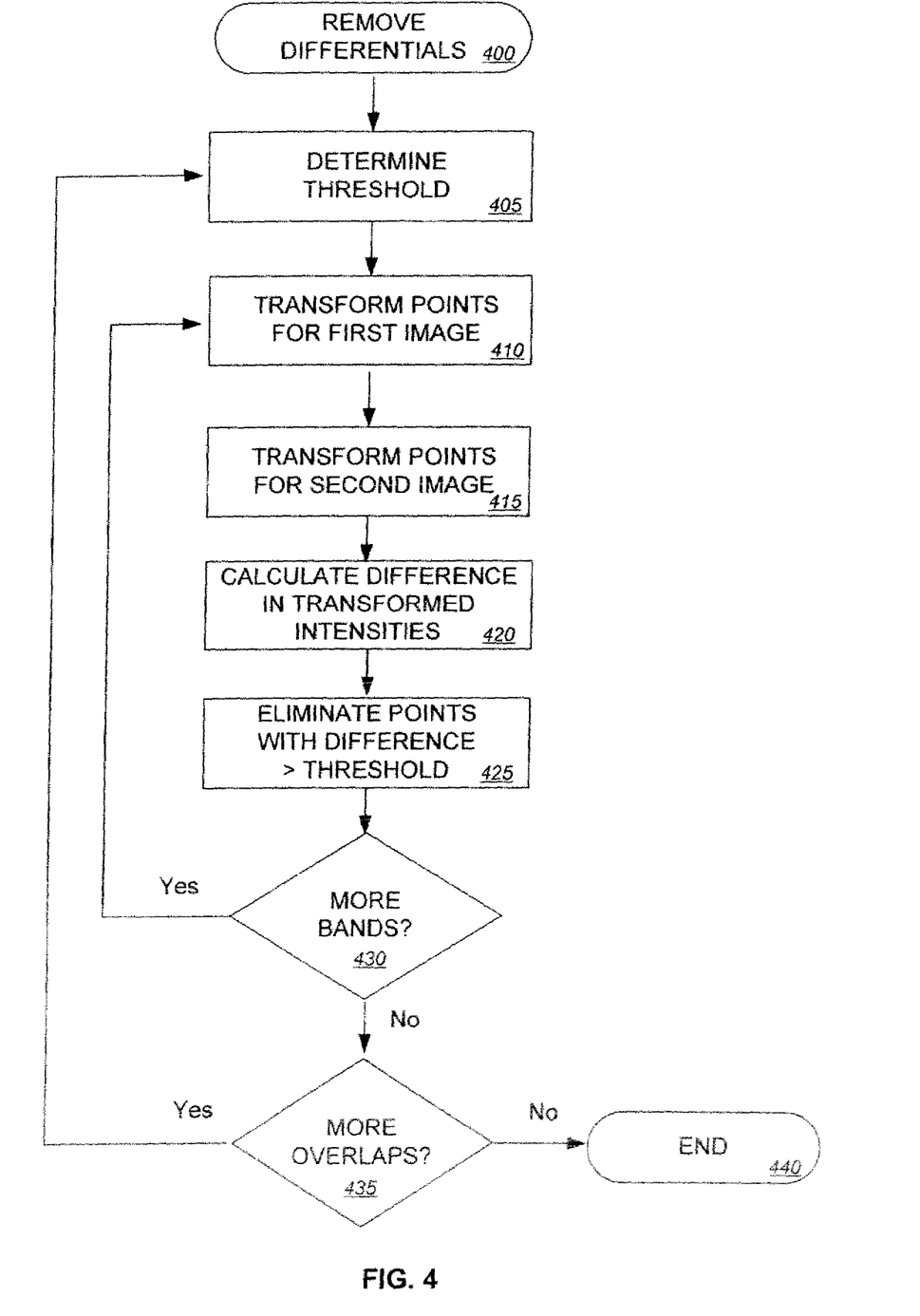
FIG. 4 is a flow diagram illustrating an exemplary method for eliminating pixels with large intensity differences, which may be used in the method of FIG. 2.

FIG. 4 illustrates a method 400 that may be used to eliminate points 210 from use in the calculation to tonally balance the images. This method may be used to remove points from the calculation where they have differences in intensities greater than a predetermined threshold. This process may be performed for each spectral band (e.g., red, green, blue, infrared) of points in an overlap region, such as overlap region 101 between images 100, 110.

First, a threshold is determined 405. Points having a difference in intensities in a spectral band, larger than the threshold, will be eliminated 210. The threshold may be a predetermined value, such as 256 for 11-bit images and 32 for 8-bit images.

In one embodiment, the threshold may be a calculated value that changes between iterations of balancing the images 200. In the first iteration, the threshold may be a determined value. Subsequent iterations may calculate the threshold by applying a multiplier to the last value of the threshold. Increasing the threshold will cause fewer points to be eliminated 210, while decreasing the threshold will cause more points to be eliminated. By way of example, the threshold may be multiplied by two if the fraction of points eliminated 210 by a previous iteration is more than a minimum value (e.g., 95% of points). Similarly, the threshold may be divided by two if the fraction of points eliminated 210 by a previous iteration is less than a minimum value. In one embodiment, the threshold may not be allowed to become smaller than a minimum amount, such as 25 for 11-bit images and 5 for 8-bit images.

After the threshold has been determined 405, the intensities for points for a first spectral band of a first image 100 that are located in overlap region 101 may be transformed 410 by applying one or more of an atmospheric correction, a backscattering correction, and a current gain and bias to the point. The current gain and bias may be the gain and bias obtained from the last iteration of balancing images 200. One method that may be used to transform the points is described in further detail with reference to FIG. 6. The intensities of points for the first band in second image 110 that are located in overlap region 101 of the pair of images 100, 110, are also transformed 415.

Next, the differences between corresponding points in the first image 100 and the second image 110 are calculated 420. Points having a difference in intensities larger than the threshold are eliminated 425 from the algorithm used to tonally balance the images. It should be appreciated that by transforming the points with the value of the gains and biases chosen by last iteration, points that are eliminated may differ between iterations. For example, a point eliminated in iteration 1 may not be eliminated in iteration 2.

If there are any more bands remaining 430, processing continues by transforming points for the next band for the first image 410. Otherwise, processing continues by determining if there are any additional overlap pairs of images that need to be processed 435. If there are, processing continues by determining a threshold for that pair of images 405. Otherwise, the method ends 440.

The method 400 described to eliminate points 210 having a difference in intensities above a threshold describes a method that is used for a pair of images 100, 110 in an overlap 101. In overlap region 111 with multiple images 100, 110, 130, points may be eliminated by performing the method 400 for each pair of images 100/110, 110/130, 100/130 that overlap. In alternate embodiments, the equations used to eliminate the points 210 may be altered to calculate transformed intensities using all of the images contributing to an overlap simultaneously.

Figure 5:
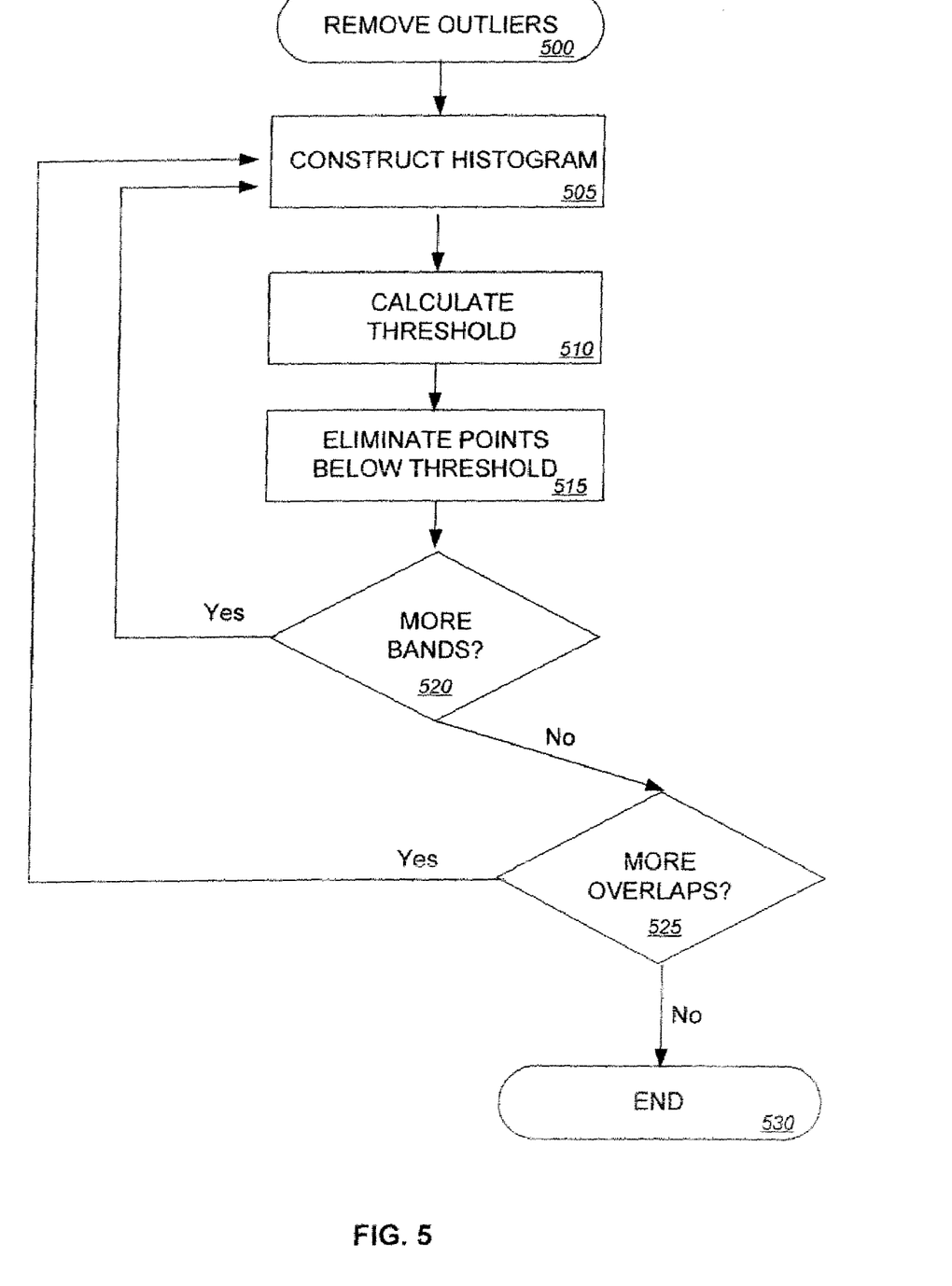
FIG. 5 is a flow diagram illustrating an exemplary method for eliminating outliers, which may be used in the method of FIG. 2.

FIG. 5 illustrates a second exemplary method 500 that may be used to eliminate points 210. This method may improve the tonal balancing of the images by eliminating points which are outliers or otherwise unusual. It may be used in conjunction with or instead of the method described in FIG. 4. In one embodiment using both methods 400 and 500, the threshold determined 405 in method 400 may be a calculated value that uses the total number of points eliminated from both methods to determine if the threshold should be multiplied or divided by the multiplier.

First, a two-dimensional histogram 505 is constructed for the intensities of a pair of images in a first spectral band. In one embodiment, the intensities used to construct the histogram may be transformed intensities that may have been transformed using a process similar to that described with reference to FIG. 6. It should be appreciated that by using transformed intensities, points eliminated 210 from the algorithm used to balance the images may differ between iterations.

Table 1 illustrates representative data that will be used to describe the method to remove outliers 500 from the algorithm used to tonally balance the images. It should be appreciated that the data shown in Table 2 was chosen for the purposes of illustrating the equations of FIG. 5 and does not necessarily reflect real data from images.

TABLE 1

| image #1 intensity | image #2 intensity | frequency % |
|---|---|---|
| 45 | 40 | 10 |
| 45 | 44 | 30 |
| 45 | 47 | 50 |
| 37 | 45 | 10 |

The 2D Histogram illustrates the percentage of points in the first spectral band for an overlap region between two images 100, 110 that had a particular pair of intensities between corresponding points. In the sample data of Table 2, the intensity pair of 45 and 40 occurs in 10% of corresponding points in an overlap region between the two images. Similarly, intensity pairs of 45/44 occur in 30% of the points, intensity pair 45/47 occurs in 50% of the points and intensity pair 37/45 occurs in 10% of the points. In some embodiments, the size of the histogram may be limited by scaling.

The histogram is used to calculate a threshold 510. In one embodiment, the threshold 510 may be calculated using an equation such as that shown in Equation (7).

$$\sum_{a,b} h_{ab} \Theta(h_{ab} - h_T) > H \qquad (7)$$

where a, b is an intensity pair, $h_{ab}$ is the value of the histogram for intensity pair a, b, and $\Theta(x)=1$ if $x>0$ and 0 otherwise, $h_T$ is the calculated threshold and H is a fraction of points to retain. In one embodiment, H may be 0.75, causing 25% of the points to be eliminated from an overlap between two images.

Applying the equation to the data of Table 1, $h_T$ is determined to be a number greater than 0.10 and less than 0.30. Points having a frequency occurrence less than the threshold are eliminated 515 from the algorithm used to tonally balance the images. In the illustrative data of Table 1, points with the intensity pairs of 45, 40 and 37, 45 are eliminated.

If there are other spectral bands to process 520, the method continues with constructing a 2D Histogram for the next band 505. Otherwise, a determination is made whether there are more overlap image pairs to process 525. If there are, method 500 continues by constructing a 2D Histogram for the next overlapping image pair 505. Otherwise, the method ends 530. Although method 500 describes a process for eliminating points from a pair of images that overlaps the equations may be altered in alternate embodiments to eliminate points from a set of more than two overlapping images.

Transforming Points

Method 600 that may be used to transform points 410 will now be described with reference to FIG. 6. Points in a first spectral band of a first image 100 that are located in an overlap region 101 may be transformed 410 as illustrated in Equation (3).

$$\tilde{I}=g(I-a+s)+b \qquad (8)$$

where $\tilde{I}$ is the transformed intensity of a first spectral band (e.g., red) of the first image at a point located in an overlap region, g is a current gain value, I is the image intensity in the first image for the first band of the point, a is an atmospheric correction, s is a backscattering correction, and b is a current bias value.

An atmospheric correction a for a first spectral band in a first image is calculated 605. The atmospheric correction may adjust for intensities in the points caused by atmospheric shifts, such as changes in the moisture content of the air. The atmospheric correction a may be calculated 605 using a method such as that described in FIG. 7. Other methods may also be used to calculate atmospheric correction a.

The intensity I for the first band of the point in the first image is also obtained 610. A backscattering correction s for the point is then calculated 615. The backscattering correction s may depend on the location of the point in the image and is usually approximated as a linear drift. Other suitable methods for calculating a backscattering correction may also be used. It may be needed in images having a noticeable east-west drift in intensity caused by changes in the camera-target-sun geometry across the images. Other embodiments may not require the backscattering correction s.

To transform the points 410, a gain g and bias b for the first band of the first image is obtained 620. By way of example, for the first iteration of tonally balancing the images 200, the gain may be set at 1 and the bias may be set at 0. This will cause the intensity of the point in the first band to merely be adjusted with the atmospheric correction a and the backscattering correction s. Subsequent iterations may use the value of the gain g and bias b obtained by the algorithm 215 in the previous iteration. The gain and bias are applied to the point as described in Equation (8).

After all of the values used in the transformation Equation (8) have been obtained or calculated, the transformed intensity $\tilde{I}$ for the first band of the point in the first image is calculated by subtracting the atmospheric correction a from the image intensity/and the backscattering correction s is added to the result. This is then multiplied by the gain g. Finally, the bias b is added to produce the transformed intensity $\tilde{I}$ for the first band of the point in the first image.

If there are more points 630 from the first image located in the overlap, processing continues by obtaining the current intensity of the next point 610. It is not necessary to obtain the atmospheric correction a, as the atmospheric correction was calculated for all points in the first band of the first image. If there are no more points left to process, the transformation of points for the first band of the first image ends 630.

Figure 6:
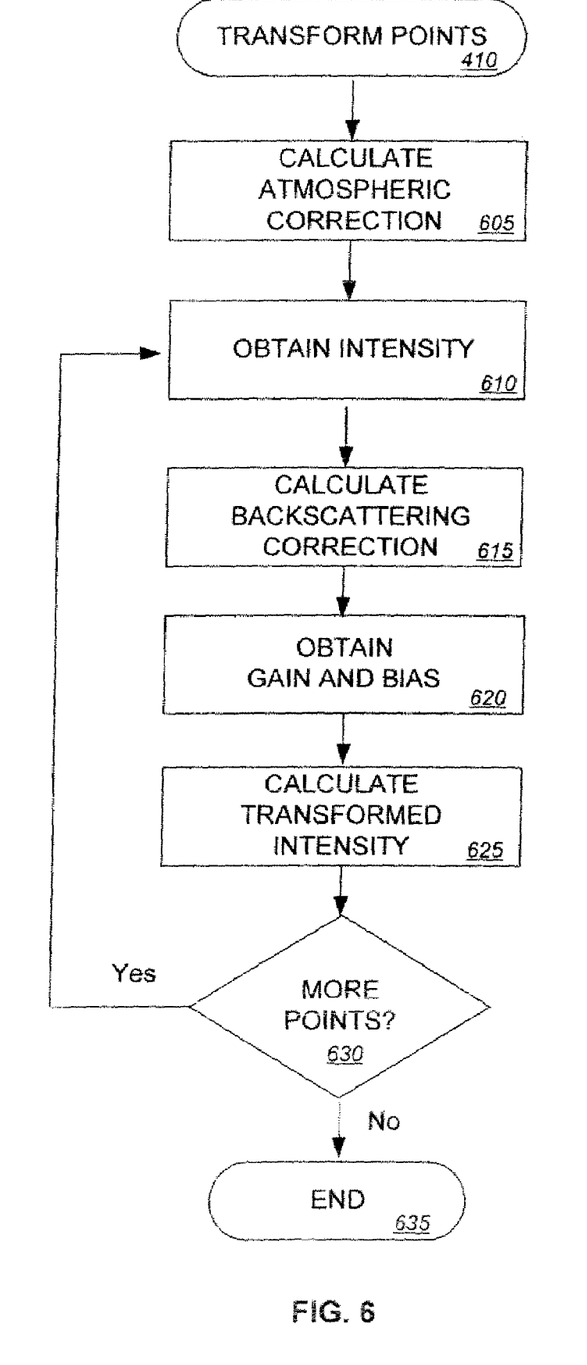
FIG. 6 is a flow diagram illustrating an exemplary method for transforming points, which may be used in the method of FIG. 4.

It should be appreciated that Equation (8) and FIG. 6 illustrate one exemplary method that may be used to transform points 410. In alternate embodiments, points may be transformed using a different method. For example, the atmospheric correction a and/or backscattering correction s may not be used to transform the points. Additionally, a non-linear method may be used to transform the points.

Atmospheric Correction

Figure 7:
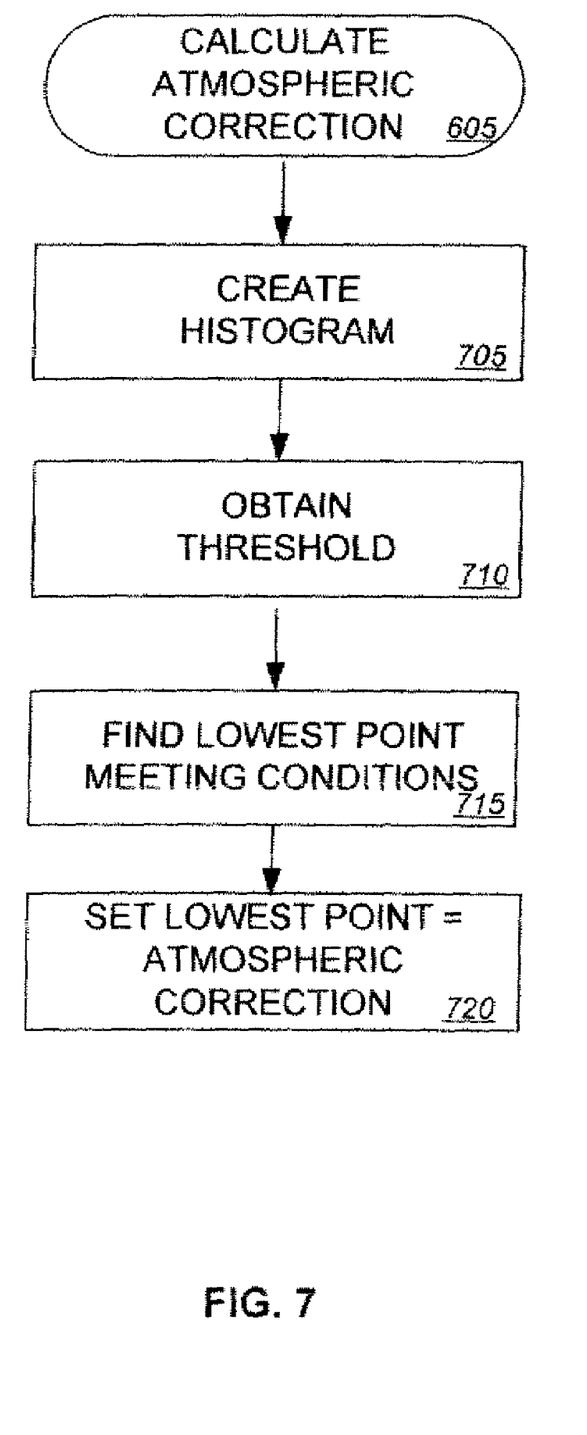
FIG. 7 is a flow diagram illustrating an exemplary method for calculating an atmospheric correction, which may be used in the method of FIG. 5.
Figure 8:
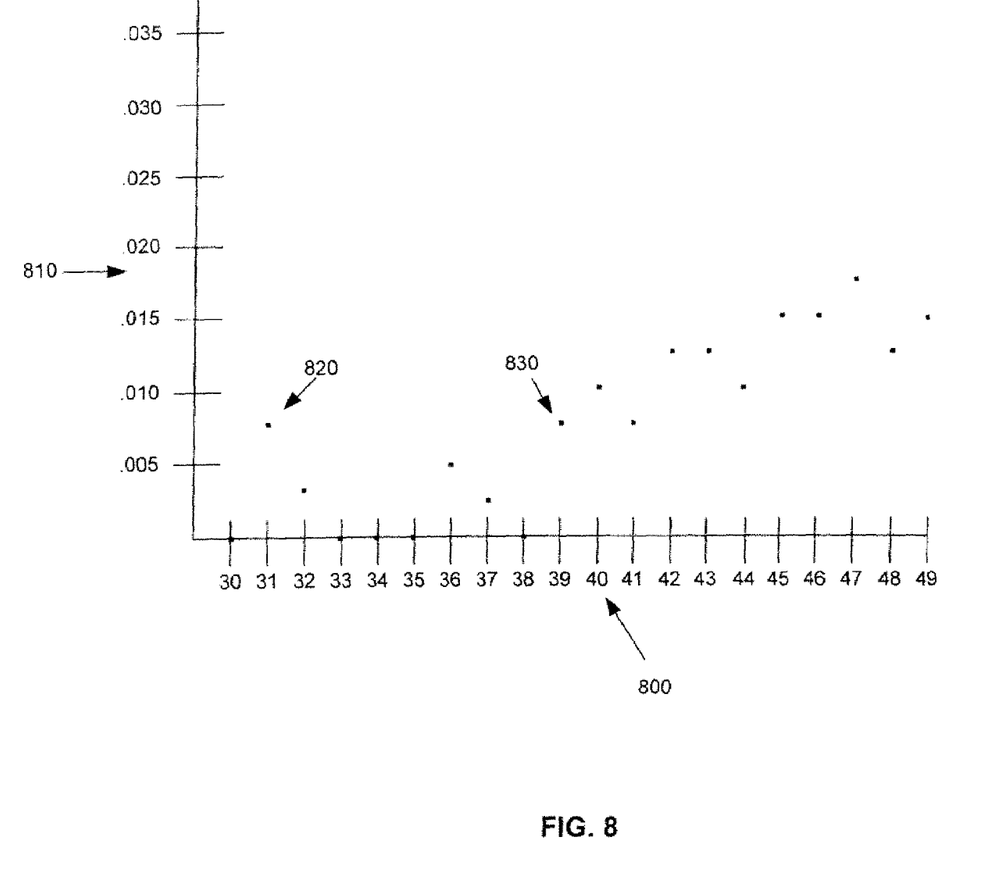
FIG. 8 illustrates a histogram that may be constructed and used in the method of FIG. 7.

FIGS. 7 and 8 illustrate a method of calculating an atmospheric correction for points in a first image. First, a histogram is created 705. FIG. 8 illustrates a portion of an exemplary histogram of a first spectral band of a first image. As shown in FIG. 8, the x-axis 800 of the histogram has possible intensities of points in the first band. For example, an image with 8-bit points has possible intensities for a band ranging from 1 to 255. The y-axis of the histogram 810 has the percentage values for points in the image with intensity x. Table 2 illustrates a portion of exemplary data for a first spectral band of a first image that may be used to create the histogram depicted in FIG. 8.

TABLE 2

| Intensity | Frequency % |
|---|---|
| 31 | .0075 |
| 32 | .0025 |
| 33 | 0 |
| 34 | 0 |
| 35 | 0 |
| 36 | .005 |
| 37 | .0025 |
| 38 | 0 |
| 39 | .0075 |
| 40 | .010 |
| 41 | .0075 |

It should be appreciated that the data illustrated in FIG. 8 is exemplary data used to illustrate the atmospheric correction calculation and does not necessarily represent real data that may be found in an image.

After the histogram is created 710, a threshold frequency for a percentage of the total number of points is obtained 710 or calculated. This may be a very small percentage of the points such that points with intensities below the threshold are likely to be caused by noise sources, which cause the intensities of the points to fall below a theoretical minimum intensity. In FIG. 8, 0.005 may be used as the threshold.

Next, the lowest point on the histogram above the threshold such that the identified point and a few points after it are above the threshold is found 715. In the histogram of FIG. 8, the point 830 corresponding to the intensity value of 39 is identified as the lowest point meeting the previous conditions. Point 820 is not identified, because although it is a low point above the threshold, the points immediately after it are not.

The intensity of the lowest point identified in block 715 is set as the atmospheric correction a 720. Thus, the intensity of point 830 of 39 is set as the atmospheric correction for the first spectral band of points in the first image. It should be appreciated that alternate embodiments may use a different method of calculating atmospheric correction a than that described above.

Adjusting Weights

Figure 9:
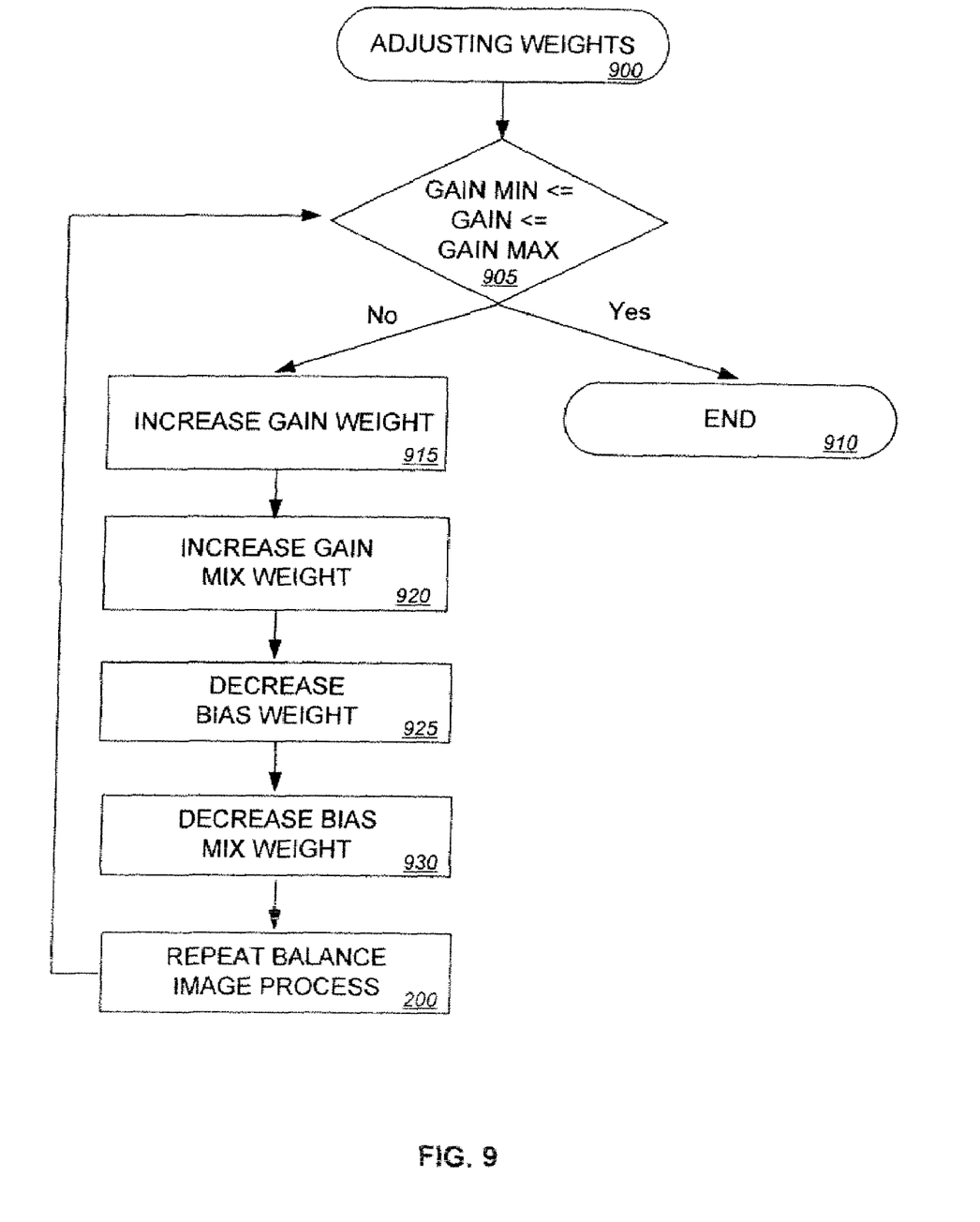
FIG. 9 is a flow diagram illustrating an exemplary method for adjusting weights, which may be used in an algorithm to tonally balance multiple images.

FIG. 9 illustrates an exemplary embodiment where the weights ($w_g$, $w_b$, $\Lambda_g$, $\Lambda_b$) used in the minimization equation are adjusted (900). Before the points are transformed 235, a check may be performed to determine if all, or a subset, of the gains output from the last iteration are within a desired range 905 between a minimum desired gain and a maximum desired gain. If the gains are within the desired range, the process ends 910 and may continue with the transformation of the points 235 or outputting the gains and biases.

If the gains are not within the desired range, the gain weight $w_g$ and the gain mix weight $\Lambda_g$ may be increased 915, 920 by a predetermined factor, increasing the influence of the weights to keep the gains closer to the desired gain. Additionally, the bias weight $w_b$ and the bias mix weight $\Lambda_b$ may be decreased 925, 930 by a predetermined factor, allowing the biases to move around more freely to achieve a better balancing between the images. In one embodiment, the gain weight $w_g$ and the gain mix weight $\Lambda_g$ are increased by a factor of 8 from the previous value and the bias weight $w_b$ and the bias mix weight $\Lambda_b$ are decreased by a factor of 8 from the previous value. Other adjustments are also contemplated and each term may have a different adjustment than the other terms. In other embodiments, one or more of the gain mix weight $\Lambda_b$, the bias weight $w_b$, or the bias mix weight $\Lambda_b$ may not be adjusted.

After the weights have been adjusted, the balance image process is repeated 935. The gains may again be checked at the end of the iterations and adjusted if needed 900.

Reducing Clipping

Figure 10:
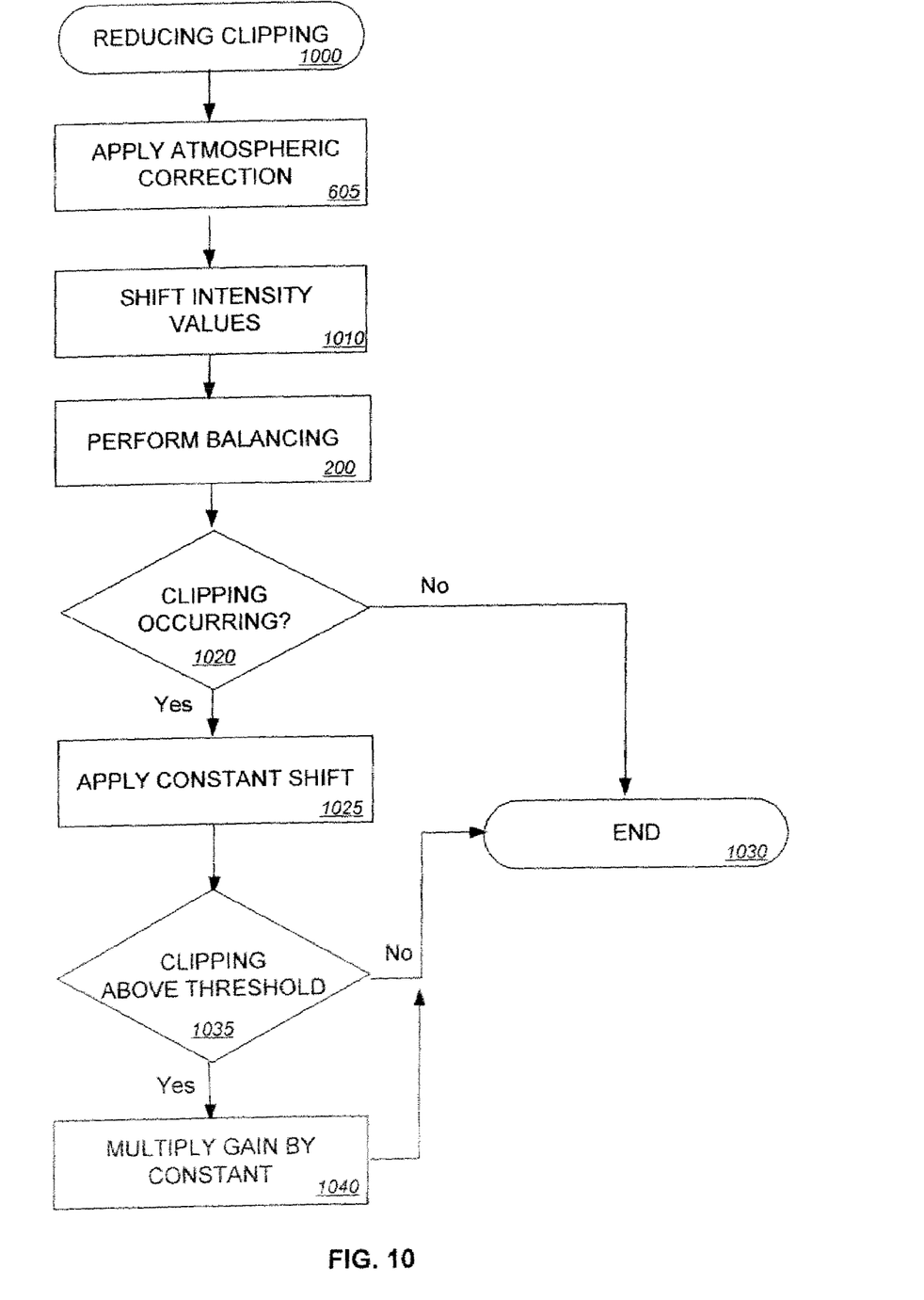
FIG. 10 is a flow diagram illustrating an exemplary method for reducing clipping, which may be used in an algorithm to tonally balance multiple images.

The minimization equation (1) described above produces biases that average to zero. Thus, some of the biases obtained from the equation are negative and some are positive. The negative biases may cause clipping in some of the images where the intensities were further decreased by an atmospheric correction a. Clipping occurs when a transformed intensity is outside the allowed range for the intensities, such as 1 to 255 for 8-bit images or 1 to 2047 for 11-bit images. FIG. 10 illustrates a method that may be used to reduce clipping 1000.

An atmospheric correction a may be applied to the intensities for each band of one or more images 605. After the atmospheric correction is applied, the intensities may be increased by a calculated amount to shift the intensities back up 1010 so they are centered in a desired range. By way of example, the intensities may be shifted by a same value for all bands of all images and may be approximately equivalent to half the smallest atmospheric calculation a for the image.

Next, balancing of the images is performed 200 as described above. After the gains and biases from the last iteration have been obtained, a check is performed to determine if the images are being clipped 1020. If they are not, the method ends 1030.

If clipping is occurring, an attempt is made to find a uniform shift 1025 to the biases that will cause the worse underclipping for a single band of a single image to be equal to the worst overclipping of a single band of any image. Image histograms may be used to calculate the shift.

If the remaining clipping is not above a threshold 1035, the method ends 1030. Otherwise, the gains may be multiplied by a constant less than one to reduce the clipping 1040. By way of example, the constant may be the largest constant that will cause the clipping to be below the threshold. Other methods to reduce clipping are also contemplated.

In the foregoing description, for the purposes of illustration, methods were described in a particular order. It should be appreciated that in alternate embodiments, the methods may be performed in a different order than that described. Additionally, the methods described above embodied in machine-executable instructions stored on a machine-readable medium, such as a disk drive or CD-ROM. The instructions may be used to cause the machine (e.g., computer processor) programmed with the instructions to perform the method. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for tonally balancing an image mosaic, comprising:
   supplying the image mosaic, the image mosaic having multiple overlap regions;
   identifying in the overlap regions a set of corresponding points, the corresponding points corresponding to a single location and being indicative of a tonal variation;
   establishing a tonal variation threshold;
   eliminating from the overlap regions a subset of corresponding points, the subset having tonal variation deviating from the tonal variation threshold;
   repeating the eliminating until substantially all subsets have been eliminated,
   producing adjusted overlap regions comprising a set of remaining corresponding points;
   obtaining gains and biases for each spectral band in the adjusted overlap regions;
   applying the gains and biases to transform intensities of the set of remaining corresponding points producing transformed corresponding points; and
   producing a tonally balanced image mosaic using the transformed corresponding points.

2. The method of claim 1 further comprising repeating the obtaining gains and biases after intensities of each set of remaining corresponding points have been transformed.

3. The method of claim 1 further comprising applying a backscattering correction to the image mosaic.

4. The method of claim 1 further comprising applying an atmospheric correction to the image mosaic.

5. The method of claim 4 further comprising:
   determining whether the image mosaic has been clipped; and,
   if clipping has occurred, adjusting the biases of the image mosaic uniformly to match a worst case underclipping and a worst case overclipping of intensities of the image mosaic.

6. A computer-readable medium having stored thereon instructions that when executed by the computer cause the computer to tonally balance a set of overlapping images by:
   using a subset of corresponding points in each of a plurality of image overlap regions to solve a set of minimization equations for gains and biases for each spectral band of each image, the corresponding points being points from different images having locations that correspond to each other, the subset of corresponding points consisting of corresponding points whose intensities differ less than a threshold;
   applying the gains and biases to the images;
   iterating the using and applying actions for a predetermined number of iterations, the iterating resulting in an iterated gain and an iterated bias for each spectral band of each image;
   transforming intensities of points for each spectral band in each image using the iterated gain and the iterated bias for the corresponding spectral band to produce transformed intensities of points; and
   producing a tonally balanced image mosaic by using the transformed intensities of points in the images.

7. The medium of claim 6, wherein the set of minimization equations penalize gains that stray from a desired gain.

8. The medium of claim 6, wherein the set of minimization equations encourage gains for a common spectral band to average to the desired gain.

9. The medium of claim 6, wherein the set of minimization equations penalize biases that stray from a desired bias.

10. The medium of claim 6, wherein the set of minimization equations weight corresponding points based on a size of the overlap in which they reside, to thereby give differing sizes of image overlaps equal importance in the minimization equations.

11. A computer-readable medium having stored thereon instructions that when executed by the computer cause the computer to tonally balance an image mosaic, by:

supplying the image mosaic, the image mosaic having multiple overlap regions;

identifying in the overlap regions a set of corresponding points, the corresponding points corresponding to a single location and being indicative of a tonal variation;

establishing a tonal variation threshold;

eliminating from the overlap regions a subset of corresponding points, the subset having tonal variation deviating from the tonal variation threshold;

repeating the eliminating until substantially all subsets have been eliminated, producing adjusted overlap regions comprising a set of remaining corresponding points;

obtaining gains and biases for each spectral band in the adjusted overlap regions;

applying the gains and biases to transform intensities of the set of remaining corresponding points producing transformed corresponding points; and producing a tonally balanced image mosaic using the transformed corresponding points.

12. The medium of claim 11, wherein the instructions cause tonal balancing of the image mosaic by repeating the obtaining gains and biases after intensities of each set of remaining corresponding points have been transformed.

13. The medium of claim 11, wherein the instructions cause tonal balancing of the image mosaic by applying a backscattering correction to the image mosaic.

14. The medium of claim 11, wherein the instructions cause tonal balancing of the image mosaic by applying an atmospheric correction to the image mosaic.

* * * * *